(12) United States Patent
Dell et al.

(10) Patent No.: US 6,347,367 B1
(45) Date of Patent: Feb. 12, 2002

(54) DATA BUS STRUCTURE FOR USE WITH MULTIPLE MEMORY STORAGE AND DRIVER RECEIVER TECHNOLOGIES AND A METHOD OF OPERATING SUCH STRUCTURES

(75) Inventors: Timothy J. Dell, Colchester; Steven A. Grundon, Jericho; Mark W. Kellogg, Essex Junction, all of VT (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/240,647

(22) Filed: Jan. 29, 1999

(51) Int. Cl.[7] .............................................. G06F 12/00
(52) U.S. Cl. ........................ 711/170; 711/163; 375/257; 326/30; 326/86
(58) Field of Search ................................. 711/152, 154, 711/163–167, 170; 710/14, 129, 100; 375/377, 257; 365/52; 361/737; 327/156; 326/30, 86

(56) References Cited

U.S. PATENT DOCUMENTS

| | | | |
|---|---|---|---|
| 5,343,503 A | * | 8/1994 | Goodrich ..................... 375/377 |
| 5,448,591 A | * | 9/1995 | Goodrich ..................... 375/257 |
| 5,687,330 A | * | 11/1997 | Gist et al. ..................... 710/129 |
| 5,802,395 A | * | 9/1998 | Connolly et al. ............. 710/14 |
| 6,043,694 A | * | 3/2000 | Dortu ........................... 327/156 |
| 6,049,476 A | * | 4/2000 | Laudon et al. ................ 365/52 |
| 6,111,757 A | * | 8/2000 | Dell et al. .................... 361/737 |

* cited by examiner

*Primary Examiner*—Matthew Kim
*Assistant Examiner*—Fred F. Tzeng
(74) *Attorney, Agent, or Firm*—Francis J. Thornton; Robert A. Walsh (57) ABSTRACT

The disclosed invention relates generally to electronic data storage systems that access data storage memory modules via a data bus comprised of multiple data query lines and, more particularly, to an electronic data storage system provided with a data bus that can be selectively provided with terminations thereby permitting the data storage memory to use either modules that require that the data query lines be open-ended, i.e., without terminations or modules that require that the data bus be terminated and to a method for operating such a system. The present invention is particularly directed to a single memory system that can accommodate either 3.3V DIMMs or DDR DIMMs. This is especially accomplished by providing the processor circuit, used in memory storage systems, with both (3.3V) receiver/driver circuits and double rate (DDR) receiver/driver circuits, with an identification circuit for identifying the type of DIMMs in the memory system coupled thereto, a selection circuit for selecting the receiver/driver circuits required to access the identified DIMMs, and switch for adding or removing terminations to the data query lines, interconnecting the selected receiver driver circuits to identified DIMMS. Thus the invention provides a memory system that can access either 3.3V DIMMs or DDR DIMMs and automatically provide the proper terminations on the data bus used to access the DIMMs.

22 Claims, 5 Drawing Sheets

DATA BUS STRUCTURE FOR USE WITH MULTIPLE MEMORY STORAGE AND DRIVER RECEIVER TECHNOLOGIES AND A METHOD OF OPERATING SUCH STRUCTURES

FIELD OF THE INVENTION

This invention relates generally to electronic data storage systems that access (read and/or write) data storage memory devices via a data bus, and, more particularly, to an electronic data storage system that can access different types of data storage devices via a data bus that can selectively be terminated or left open-ended as required by the memory storage devices used in the system and to a method for operating such an electronic data storage system.

BACKGROUND OF THE INVENTION

Computers, work stations, servers and other such systems, herein collectively referred to as systems, use many data storage memory units such as memory modules. Each module typically contains a plurality of individual storage bits that can be accessed, i.e., data can be written into the bits written therein and read therefrom. This is accomplished by the processor through a memory controller which is coupled to the individual storage bits, in the modules, via a data bus comprising a plurality of data query lines coupling the individual data storage bits in each module to the memory controller. As computers and the programs used therein, increased in size and complexity, industry demands for better and faster performance, i.e., faster writing and reading, were met by the creation of several different generations of processors, memory controllers and memory modules.

Memory modules, formed of a plurality of individual memory units, have under gone many transitions. The modules, presently used in such systems are typically Dual In-line Memory Modules, commonly called and hereinafter referred to as DIMMs, that are joined together and coupled to the memory controller via the data query lines to form a data net. The DIMMs presently available, in the marketplace, are typically 168 pin, 64 bit modules that use single data rate 3.3. Volt Transistor-Transistor Logic (3.3 Volt TTL) or 3.3. Volt Complimentary Metal on Silicon (3.3 Volt CMOS) receivers and drivers, hereinafter collectively referred to as 3.3 Volt DIMMs or 3.3V DIMMs. These 3.3V DIMMs are typically connected to data buses without end terminations, i.e., open-ended or un-terminated data buses. Thus, each of the data query lines in the data bus between the individual storage bits in the modules and the memory controller are generally open-ended or un-terminated.

Processors have also been improved and their speed significantly increased. However, this increase in processor speed has not resulted in the fastest possible system speeds because the memory access rate to a system memory, populated by the 3.3V DIMMs, is limited to the front-side bus speed from the processor. For maximum performance the system main memory should operate at a rate faster than the front-side bus clock rate since additional components in the system may also limit or be limited by the memory system access rate. A slow memory access rate prevents the faster processor speeds from being realized and thus is a severe bottleneck. To eliminate this bottleneck, there has now been proposed a solution, wherein new DIMM modules capable of providing data to the processor faster than the memory clock rate are used. These DIMMs are known as Double Data Rate (DDR) DIMMs and as Quadruple Data Rate (QDR) DIMMs. Since the present invention can be used with either of these new DIMMs, they will be hereinafter collectively referred to as DDR (Double Data Rate) DIMMs.

These DDR DIMMs require lower voltages (typically 2.5 volts) than are required by the 3.3V DIMMs and, when arranged in multi-drop nets, also require, single or double ended, terminated data busses. Thus they are not compatible with the older 3.3 Volt systems that use open-ended or un-terminated data buses. New systems capable of using such DDR DIMMs are now being developed. These new systems will, when populated with these DDR DIMMs, have a memory access rate at least twice that of systems using 3.3V DIMMs thereby boosting both system performance and system speed.

Although these new Double Data Rate (DDR) systems, and the older Low Voltage systems, all use DIMMs, the need for data bus terminations and lower voltages required by the new DDR DIMMs prevents the newer systems designed for DDR DIMMs from using the older 3.3V DIMMs.

Because of the wide variety in computer needs, when new systems are being introduced, manufacturers, to maintain their customer base, must continue to manufacture the older systems as they simultaneously introduce the newer systems. This requires the manufacturer to stock different parts to provide both the new and the old systems. This requires an increase in the number of required parts which means inventory, logistical problems, and the possibility of human error in assembly of the systems also increase. Moreover multiple parts, especially when similar, can cause confusion during both manufacture of the initial computer and repair of the computer in the field.

In addition, due to a large investment in these older memories, many users will require, when upgrading to new systems, that their old memories be usable in the new systems to which they are upgrading.

Still further, the new and improved DDR DIMMs systems will typically be more costly and, initially, may not be available in the necessary quantities. By providing a system that can accommodate both the old and new technologies these problems will be mitigated for it will permit the customer to configure the memory portion of his system based on cost and performance.

Therefore, although new systems can be built to use only this new DDR approach, there still exists a need for a system that is capable of operating both the older 3.3V DIMMs and the newer, lower voltage, faster DDR DIMMs. Such an improved system will thus permit a manufacturer to offer and provide a wider range of systems to his customers including the choice of either the newer or the older technologies while reducing his inventory, logistical and assembly problems.

Furthermore the present invention permits a manufacturer to do so without either substantial changes to the basic system or a significant increase in cost.

SUMMARY OF THE INVENTION

The present invention is directed to a solution to this problem and permits computer manufacturers to build a data storage system capable of accessing, i.e., reading and writing, not only the new DDR DIMMs but also the older, widely used and readily available 3.3V DIMMs.

Thus, the present invention results in an improved system in which either 3.3V DIMMs or DDR DIMMs can be used.

Accordingly, it is an object of the invention to provide a single memory system that can accommodate either 3.3V DIMMs or DDR DIMMs. This is especially accomplished by providing the memory controller circuit, used in such memory storage systems, with both the older (3.3V) receiver/driver circuits and double rate (DDR) receiver/driver circuits, means for identifying the type of DIMMs in the memory system coupled thereto, means for selecting either the (3.3V) receiver/driver circuits or the double rate (DDR) receiver/receiver circuits required to access the identified DIMMs, means for adding or removing terminations to the data query lines which interconnect the selected receiver driver circuits to the identified DIMMS and means for changing the data interface and address command voltage levels.

Accordingly, it is a further object of the invention to provide a single memory system that can access either 3.3V DIMMs or DDR DIMMs and provide the proper terminations on the data bus used to access the DIMMs.

These and other objects and features of the present invention will become further apparent from the following description taken in conjunction with the drawings.

DESCRIPTION OF THE PREFERRED EMBODIMENT

Figure 1:
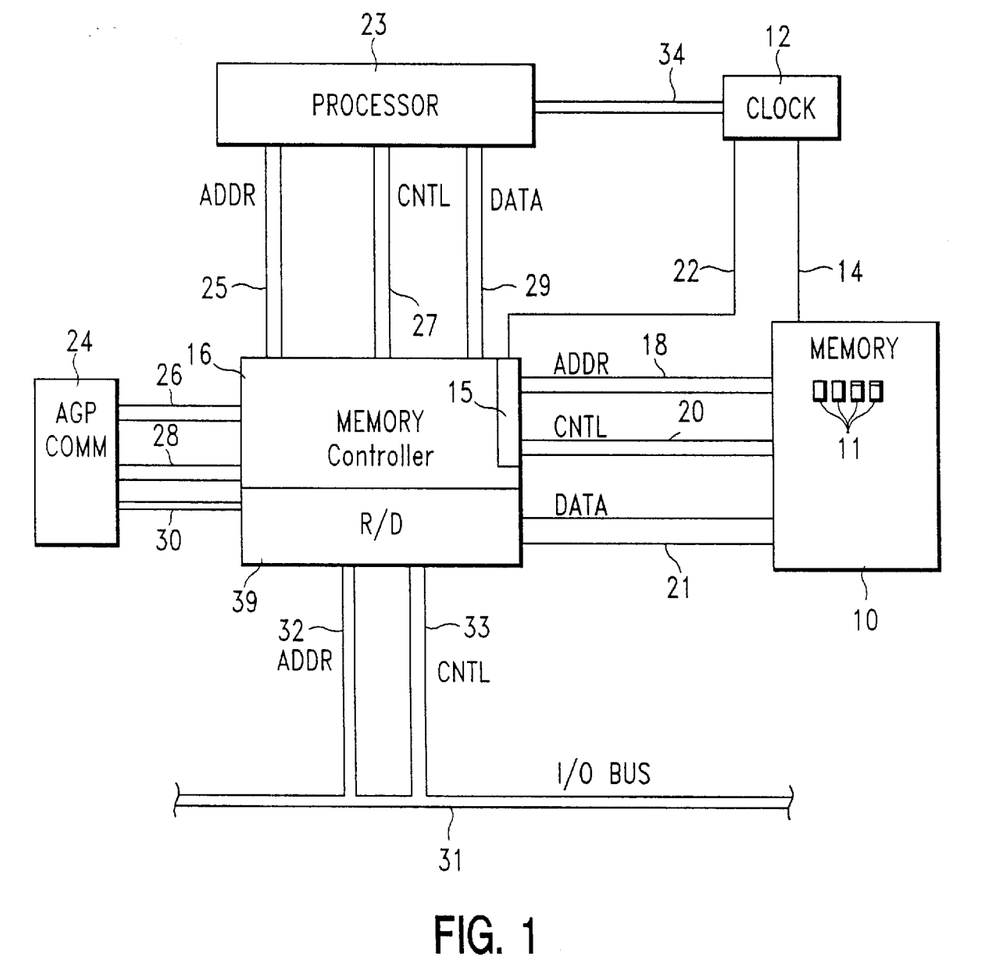
FIG. 1 is a block diagram illustrating how a processor, memory controller and a memory are typically arranged in a system.
Figure 2:
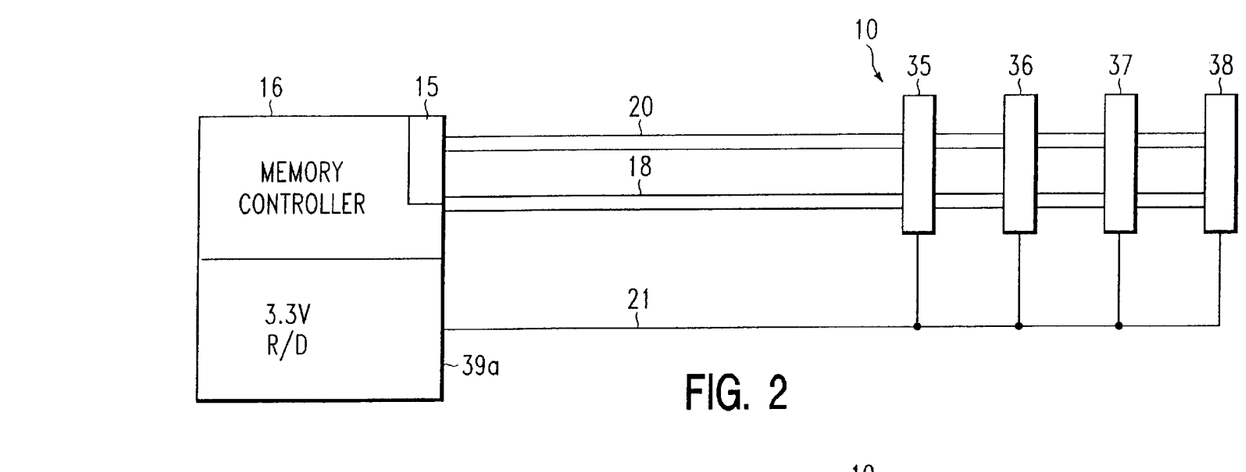
FIG. 2 is a more detailed block diagram of that portion of FIG. 1 showing the memory controller, the memory, populated with 3.3V DIMMs, and the interconnecting data query lines.

Referring now to FIGS. 1 and 2 those portions of a typical memory system generally relating to the present invention will be described. FIG. 1 is a partial block diagram of a portion of a typical memory system and illustrates how a processor, a clock, a memory controller and a memory formed of data storage devices are typically coupled together. In these FIGS. 1 and 2, there is shown a memory 10 which contains a plurality of data storage devices, i.e., Dual Inline Memory Modules 11, hereinafter referred to as DIMMs. Each of these DIMMs 11 contains numerous data bits or bits as is well known to the prior art. The interconnecting of large numbers of such DIMMs to form the memory 10 is also well known to the art and need not be discussed here. The memory 10 is coupled to a clock 12, via one or more clock lines 14, and to a memory controller 16 via an address bus (ADDR) 18, a control or command bus (CNTL) 20 and a data bus (DATA) 21 comprising multiple data query lines. The memory controller 16 is further coupled to the clock 12 via a one or more additional clock lines 22, to a processor 23 and often to a graphics controller 24 via respective address busses 25 and 26, respective control busses 27 and 28 and respective data lines 29 and 30. The processor 23 is also coupled to the clock 12 via one or more lines 34. The memory controller 16 is further coupled to one or more Input/Output (I/O) buses 31 via respective address and control buses 32 and 33.

The memory controller 16 contains a plurality of receiver/driver circuits 39 each of which is coupled, via a respective one of the data query lines forming the data bus 21, to respective data bits on each of the DIMMs forming the memory 10. Other driver circuits 15 are used to set 3.3 volts on the address bus 18 and the control bus 20.

The number of receiver/driver circuits 39, contained in the memory controller 16, and the number of data query lines, in the data bus 21, are equal to the data width in each DIMM in the memory 10. Thus, if it is assumed, for example, that each DIMM has a data width of 64 then 64 receiver/driver circuits and 64 data query lines in the data bus 21 would be required so that each data query line would interconnect a specific data bit location on each DIMM to a respective receiver/driver circuit. In this way a single bit, in a single DIMM can be written or read, in a manner well known to the art. Since the use and design of such systems is widely and well known to those skilled in the art, further explanation of the system and its use and operation need not be presented here.

FIG. 2 shows schematically and in further detail the arrangement when the memory 10, shown in FIG. 1, is formed of 3.3V DIMMs 35, 36, 37, and 38. For purposes of illustration only, FIG. 2 shows the memory controller 16 with but a single receiver/driver circuit 39a that is coupled, via a single data query line 21 in data bus 21, to only four DIMMs 35, 36, 37 and 38. It being understood, by those skilled in the art, that many such DIMMs would normally be used in the memory 10 and that there would be as many receivers/drivers as required by the data width of the DIMMs used in the system. That is, the number of receiver/driver circuits 39, contained in the memory controller 16, and the number of data query lines, in the data bus 21, are equal to data width on each DIMM in the memory 10. Furthermore the number of driver circuits 15 are sufficient to supply the desired voltage level to all the lines in the address bus 18 and the control bus 20.

It should be clearly understood that, in this FIG. 2, only a single data query line 21a, which is but one of many in the data bus 21, is shown connecting a specific storage location in each of the plurality of 3.3V DIMMs 35, 36, 37 and 38 forming the memory 10 to the receiver/driver circuit 39a. Again, since such data query lines, receiver/driver circuits, storage bits and their interconnections, operations and use are well known to the industry, it is believed that no further explanation is necessary.

The receiver/driver 39a, shown in this FIG. 2, is a prior art (3.3V) receiver/driver capable of operating only with 3.3V DIMMS that must be queried, i.e., written or read, through a respective Data Query line. Each such data query line is connected at its source or proximal end, i.e., the end adjacent to the receiver/driver, to a respective receiver/driver circuit and is connected at its other or distal end, i.e., the end distant from the receiver/driver, to a specific data bit on each DIMM. It is to be noted that in this FIG. 2 the data query lines have neither source end parallel nor distal end parallel terminations. Also the driver circuits 15 are (3.3V) driver circuits capable only of supplying 3.3 volts to the address bus 18 and the control bus 20.

Figure 3:
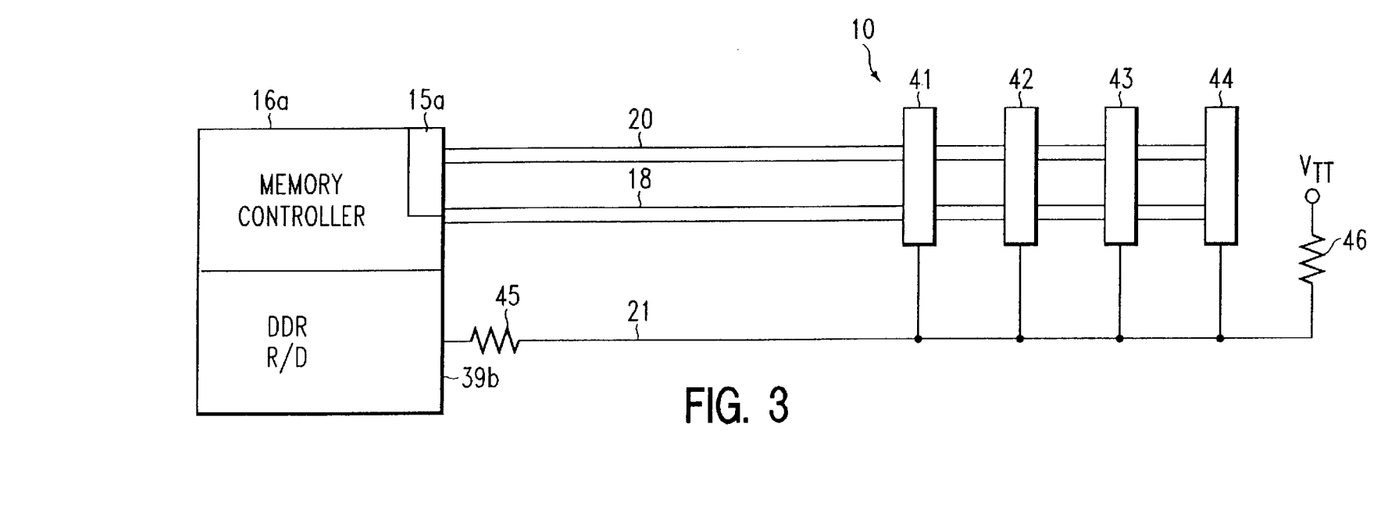
FIG. 3 is a more detailed block diagram of that portion of FIG. 1 showing of the memory controller, the memory, populated with DDR DIMMs, and the interconnecting data query lines.

FIG. 3 is a block diagram illustrating how both the memory controller 16 and data bus 21, of FIG. 1, must be modified to enable a memory system to employ DDR DIMMS. As noted above, the DDR DIMMs require, in multi-drop nets, data query lines terminated at both ends. That is, each data query line must be provided with terminations at both its source or proximal end and at its distal or terminal end.

Figure 6:
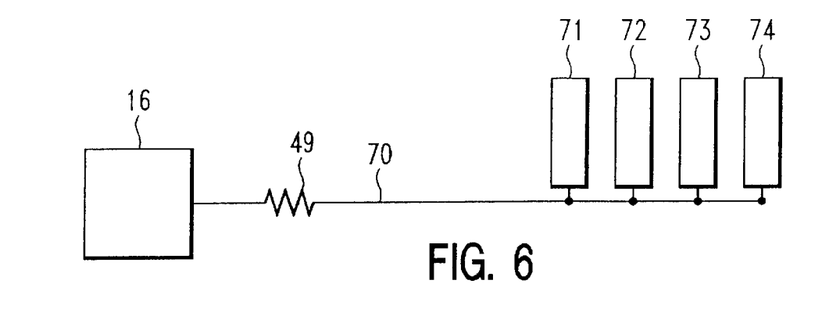
FIG. 6 shows a block diagram of a data query line having a source series termination.
Figure 7:
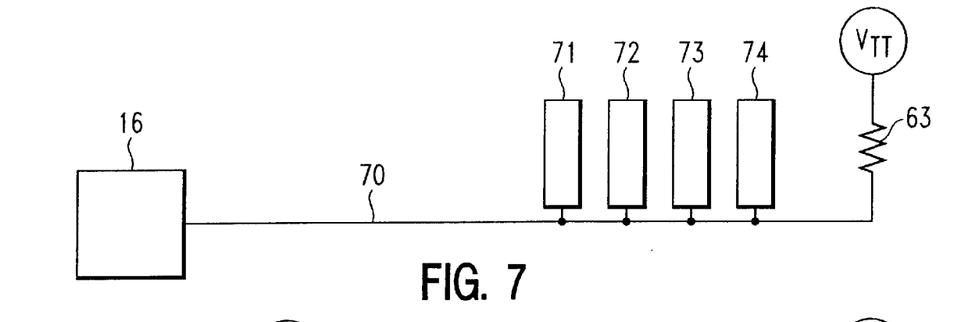
FIG. 7 shows a block diagram of a data query line having a distal end parallel termination.
Figure 8:
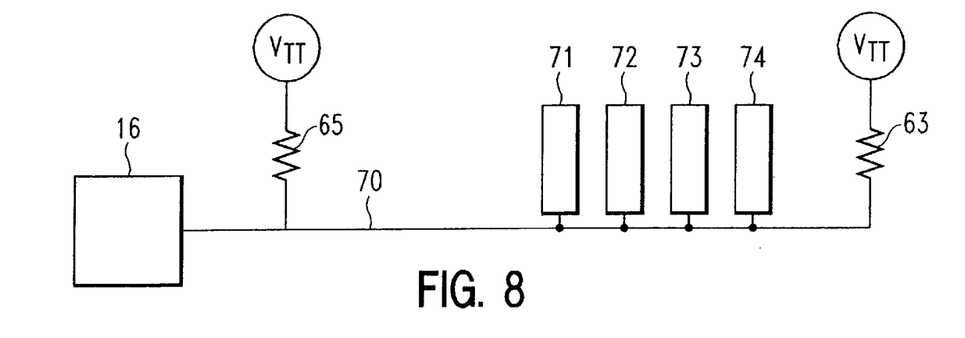
FIG. 8 shows a block diagram of a data query line having a source parallel termination and a distal end parallel termination.

These terminations may assume different arrangements and combinations as will be discussed below. For example, FIG. 6 shows a data query line 70, coupled between a memory controller 16 and a plurality of DIMMs 71, 72, 73, 74 being provided with a source series termination shown as resistor 49. FIG. 7 shows a data query line 70, coupled between a memory controller 16 and a plurality of DIMMs 71, 72, 73, 74 being provided with a distal end parallel termination, shown as resistor 63, coupling the line 70 to a voltage $V_{TT}$. FIG. 8 shows a data query line 70, coupled between a memory controller 16 and a plurality of DIMMs 71, 72, 73, 74 being provided with a source parallel termination shown as resistor 65 coupling the line 70 to a voltage $V_{TT}$ and with a distal end parallel termination, shown as resistor 63, also coupling the line 70 to the voltage $V_{TT}$.

It should be understood that these various terminations may be further combined in an actual configuration. For example, the speed of the DIMMs may require the source end of the data query line be provided with a source series termination and a distal parallel termination or with both series and parallel source terminations and a distal parallel termination.

Again, it must be remembered that the number of receiver/driver circuits in the memory controller 16 and the number of data query lines in the data bus 21 must equal the data width on each DIMM as discussed above and that the voltage or interface levels applied to the address bus 18 and the control or command bus 20 must be lower, i.e., 2.5 volts, than the 3.3 volts required by the 3.3V DIMMs. Accordingly the controller 16a of FIG. 3 is shown with 2.5 volt address bus and control bus drivers 15a and a DDR receiver/driver 39b. Again for purposes of clarity and ease of illustration only, FIG. 3 shows the memory controller 16 with but a single DDR receiver/driver 39b coupled, via a single data query line 21b, to a plurality of DDR DIMMs 41, 42, 43, and 44 which populate the memory 10. Because DDR DIMMs require terminated data query lines, the receiver/driver 39b is a DDR receiver/driver that is provided with a series resistor 45 that terminates the data query line 21b at its proximal or source end and with a parallel resistor 46, coupled between the line 21b and the voltage $V_{TT}$, that terminates the data query line 21b at its distal end.

It should be noted that the series source resistor 45, can be designed into and included as part of the DDR receiver/driver 39b. Because the distal termination 46 is required only by DDR DIMMs, and because the DDR DIMM voltage interface has reduced amplitude, i.e., 2.5 volts versus the 3.3 volts needed by the 3.3 V DIMM interface. Because the DDR DIMs are lower voltage devices than the 3.3V DIMMs, 3.3V DIMMs and their associated 3.3V receiver/driver and bus drivers cannot be interchanged with or substituted for the DDR DIMMs and their associated DDR receiver/driver and bus drivers or vice versa. Also, as previously noted, the bus drivers 15a setting the voltage level on the address bus 18 and the control bus 20 must supply 2.5 volts which is lower voltage than the 3.3. volts required by the prior art 3.3 V DIMM circuits.

This lack of interchangeability causes the inventory, logistical and other problems discussed above and requires system manufactures to continue to manufacture the older 3.3V systems as they simultaneously introduce the newer DDR systems.

The present invention provides a solution that will end these difficulties and solves the above discussed problems. The present invention accomplishes this by providing a unique electronic data storage system that can access both 3.3V DIMMs and DDR DIMMs via the same data bus. The present invention does this by using a unique memory controller that can accommodate either 3.3V DIMMs or DDR DIMMs together with data query lines that can be automatically modified as necessary such that the memory can use either 3.3V DIMMs or DDR DIMMs. In the present invention the data query lines can be readily, easily and automatically provided with modified terminations or stripped of terminations thereby permitting the data storage memory 10 to be populated with either 3.3V DIMMs, that require that the data query lines not have their distal end terminated, or with DDR DIMMS, that require that the distal end of the data query lines be provided with a parallel termination.

Figure 4:
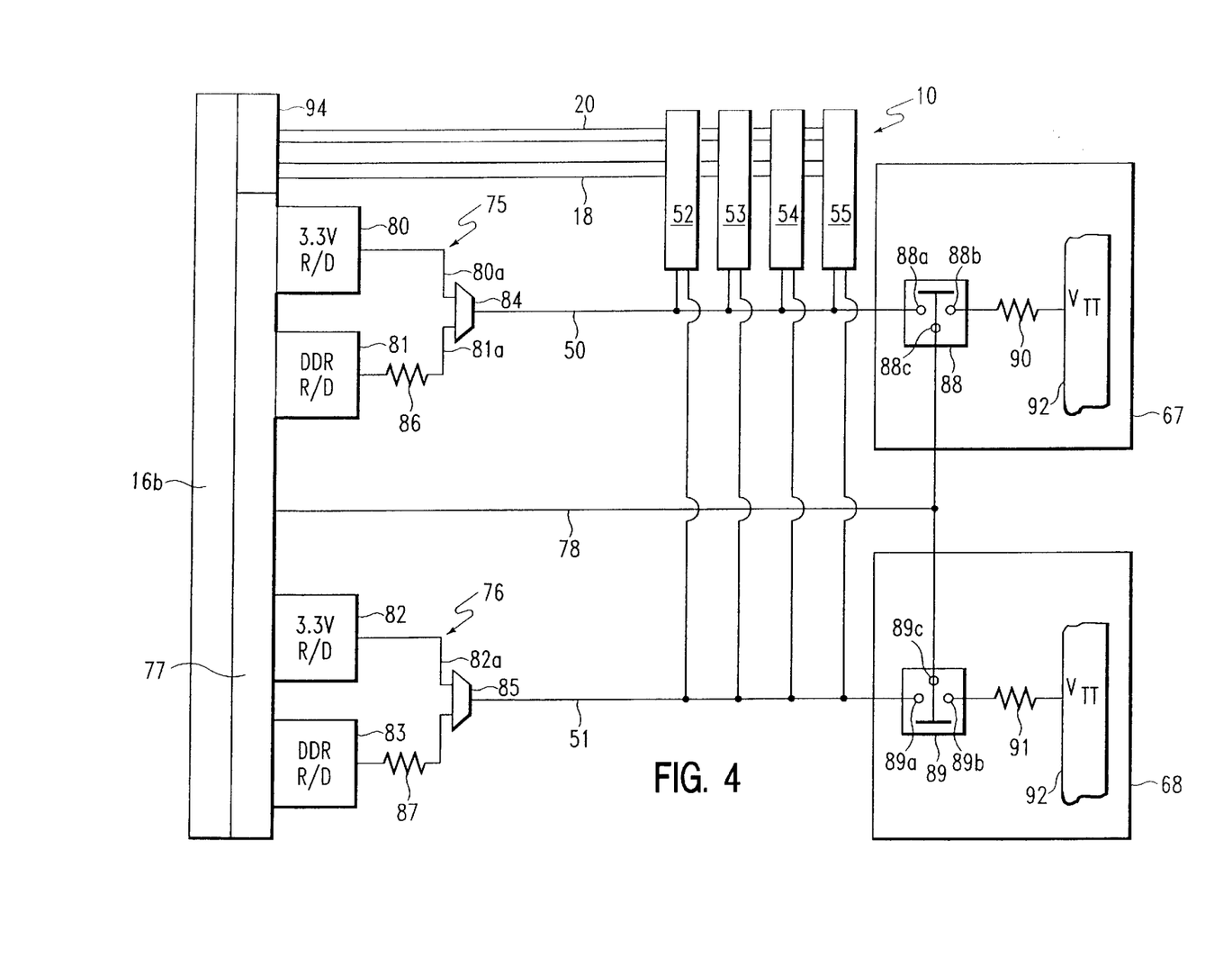
FIG. 4 is a block diagram of the invention and shows an improved memory controller having both 3.3 volt receiver/driver circuits and DDR receiver/driver circuits, provided with a source series termination, and associated data query lines that can be coupled or uncoupled from a distal end parallel termination such that the controller may be used with a memory populated with either DDR DIMMs or 3.3V DIMMs.

The present invention is particularly shown in FIG. 4. This FIG. 4 sets out a block diagram of a unique memory controller 16b containing both 3.3V DIMMs receiver/driver circuits and DDR DIMM receiver/driver circuits and address bus and control bus drivers that can be set to different voltage levels together with a data bus formed of data query lines 50 and 51 coupled to the memory 10 and respectively coupled to respective termination boards 67 and 68. It should be noted that separate termination boards are not required. Instead the elements on the boards 67 and 68 could, for example, be mounted directly on the system board carrying the memory board. By substituting this memory controller 16b, for the memory controller 16 shown in FIG. 1 and adding the termination boards 67 and 68 to the memory 10, the system of FIG. 1 can be made to operate with the newer DDR DIMMs as well as the older 3.3V DIMMs.

The unique memory controller 16b, shown in this FIG. 4, is provided with drivers 94, that can be set to provide both 2.5 and 3.3 voltage levels, receiver/driver set sets 75 and 76, each of which comprise a 3.3V receiver/driver circuit and a DDR receiver/driver circuit, an identification circuit means 77, for identifying the type of DIMMs populating the memory, and strobe means for activating the termination cards 67 and 68 to couple end terminations to the data query lines making up the system data bus.

The DIMM identification circuit means 77 can be as simple as a comparator circuit for recognizing an identifying signal from the DIMMs when they are activated. The DIMM identification means 77 is provided, in the controller 16b, to identify the type of DIMMs populating the memory 10 and to transmit a switch activation pulse via a strobe line 78 to the termination cards 67 and 68 when DDR DIMMs are found to be populating the memory 10. The DIMMs, whether 3.3V DIMMs or DDR DIMMs, are provided with identification means such as a Programable Read Only Memory (PROM) circuit, also known as Serial Presence detects (SPD's), that are built into each DIMM at the time of its manufacture. This PROM is written with a code that identifies the DIMM as either a 3.3V DIMM or a DDR DIMM. Thus the DIMMs populating the memory 10 can be made to identify their type, i.e., 3.3V DIMMs or DDR DIMMs, to the identification circuit means 77. Many circuits, suitable for reading and writing such PROMs, are widely known and readily available to those skilled in the art, and further explanation of them is not deemed necessary. Other techniques for permitting the memory controller to adjust its voltage to the level required by either the 3.3V DIMMs or the DDR DIMMs are known and readily available to those skilled in the art, and further explanation of them is not deemed necessary.

Again it is to be noted that the number of receiver/driver circuits in the memory controller 16 must equal the data width on each DIMM 52, 53, 54 and 55 populating the memory 10, thus, if it is again assumed that each DIMM 52, 53, 54 and 55, populating the memory 10, has 64 data bits then 64 sets of receiver/driver circuits would be required to query all the bits in each DIMM and since each set of receiver/driver circuits comprises a 3.3V receiver/driver circuit and a DDR receiver/driver circuit then, for the present example, the controller 16 would have a total of 128 receiver/driver circuits coupled thereto. Again the bus driver circuits 94 must be of sufficient number to provide the desired voltage levels to the address bus 18 and the command or control bus 20.

However, for purposes of clarity in both the drawings and the description of the invention, the memory controller 16b is shown in this FIG. 4 with but two sets of receiver/driver circuits 75 and 76. Each set of receiver/driver circuits 75 and 76 is respectively formed of one 3.3V receiver/driver and one DDR receiver/driver. Thus set 75 is formed of a 3.3V receiver/driver 80 and a DDR receiver/driver 81 and set 76 is formed of a 3.3V receiver/driver 82 and a DDR receiver/driver 83.

It should be noted that this arrangement is but one possible arrangement out of many that will be readily obvious to those skilled in the art.

Each 3.3V receiver/driver circuit 80 and 82 has respective outputs 80a and 82a respectively coupled to the first inputs of respective selection circuits 84 and 85. Each DDR receiver/driver circuit 81 and 83 is connected through respective source terminations 86 and 87 to respective outputs, 81a and 83a, which are in turn further coupled respectively, to the second inputs of the selection circuits 84 and 85. The outputs of these selection circuits 84 and 85 are, in turn connected, via respective data query lines 50 and 51, to respective bit data bits in each of the DIMMs 52, 53, 54, and 55 populating the memory 10.

It must be noted that the above described approach is but one possible way of implementing the invention and different circuits and other implementations will be readily apparent to those skilled in the art.

The selection circuits 84 and 85 can be, for example, a multiplexor (MUX) or an OR circuit or any other suitable circuit, that will pass only one selected input out of a number of inputs to its output. The output of each selection circuit 84 and 85 is connected, via its respective data query line 50, 51, to selected storage bit locations in each DIMM 52, 53, 54, and 55, populating the memory 10, and to a respective one of the termination boards 67 and 68.

Because the present invention provides a means whereby each data query line, forming the data bus 21, can have terminations controllably added thereto or removed therefrom, only one data line is required for each set of receiver/driver circuits in the memory controller. Thus the data query lines 50, 51 are shown connected to respective bit switches 88 and 89 carried on the respective terminator boards 67 and 68 and to different, specific bit locations in each DIMM 52, 53, 54 and 55.

Each bit switch 88, 89 has an input electrode 88a and 89a to which a data bit line 50, 51 is respectively attached. The bit switches 88, 89 also have respective output electrodes 88b and 89b connected, through respective distal terminations 90 and 91 to a voltage line 92 coupled to a voltage $V_{TT}$ which typically is 1.25 volts but can range up to 1.4 volts. The switches 88, 89 further are provided with toggle inputs 88c and 89c for opening and closing the switch 88, 89 on each card thereby coupling or decoupling the distal parallel terminations 90, 91 from the data query lines as required. The toggle inputs 88c and 89c are coupled back to the memory controller via the strobe line 78 and controlled thereby.

The address and control buses 18 and 20, when used with DDR DIMMs must be set to 2.5 volts and cannot be the 3.3 volts required by the 3.3 V DIMMs. This is accomplished by providing, in the memory controller 16b, address bus and control bus drivers 94, such as push-pull drivers, that can be readily set to provide either 3.3 volts or 2.5 volts to the address bus 18 and the control bus 20 as required by the DIMMs populating the memory 10.

Initially the receiver/driver circuits 80, 81, 82, and 83 are all turned off, the switches 88 and 89, on the terminal boards 67 and 68 are open, and the data query lines 50 and 51 are open-ended, i.e., without distal parallel terminations and the drivers 94 are off. When the system is turned on, the controller 16b causes the identification circuit 77 to query the DIMMs 52, 53, 54, and 55, in the storage 10. If the DIMMs 52, 53, 54, and 55 identify themselves as 3.3V DIMMs, the identification circuit 77 activates, i.e., turns on, the 3.3V receiver/driver circuit 80, 82 in each set of receiver/driver circuits 75, 76, and the selection circuits couple the receiver/driver circuits 80, 82 to the DLMMs 52, 53, 54, and 55 via the data query lines 50 and 51. Simultaneously the driver circuits 94 are set to supply 3.3 volts to the address bus and the control bus 18 and 20. The DDR receiver/driver circuits 81 and 83 and the strobe line 78 all remain inactive or off and the switches 67 and 68 remain in their normally open condition. Since the switches 67 and 68 are open, the data query lines 50, 51 remain un-terminated or open-ended. In this way the system operates as a 3.3V DIMM system.

If however, when the system is turned on, the identifying circuit 77 queries the DIMMs 52, 53, 54, and 55, in the storage 10 and the DIMMs 52, 53, 54, and 55 identify themselves as DDR DIMMs, the DDR receiver/driver circuits 81, 83, in the receiver/driver circuits 75, 76 are activated, i.e., turned on, while the 3.3V receiver/driver 80, 82 circuits remain off. Simultaneously the identification circuit 77, sends a signal to the bit switch toggles 88c and 89c, via the strobe line 78, to close the switches 88 and 89 and thereby connect the data query lines 50, 51 through the respective distal terminations 90 and 91 to the $V_{TT}$ voltage line 92. Simultaneously, the memory bus and control bus drivers 94, in the memory controller 16b, are set to the 2.5 volt level to supply that voltage level on the memory and address control buses 18 and 20 required by the DDR DIMMs populating the memory 10. Thus all the data query lines in the data bus, become terminated and the data, address and command interfaces, i.e., voltage levels, are set to the voltages or states necessary for the system to operate as a DDR DIMM system.

By thus providing in the system of FIG. 1 with the modified controller 16b and with means for coupling parallel terminations to the distal end of the data query lines and altering the voltage on the data, address and control or command lines, the present invention provides a storage system that will permit the data storage to be populated either with modules that require that the data query lines be open-ended, i.e., without terminations, or with modules that require that the data bus be terminated.

Accordingly the present invention provides a data storage memory system that can be populated with either 3.3V DIMMs that do not require distal end terminated data query lines or with DDR DIMMs that require distal end terminated data query lines.

Figure 5:
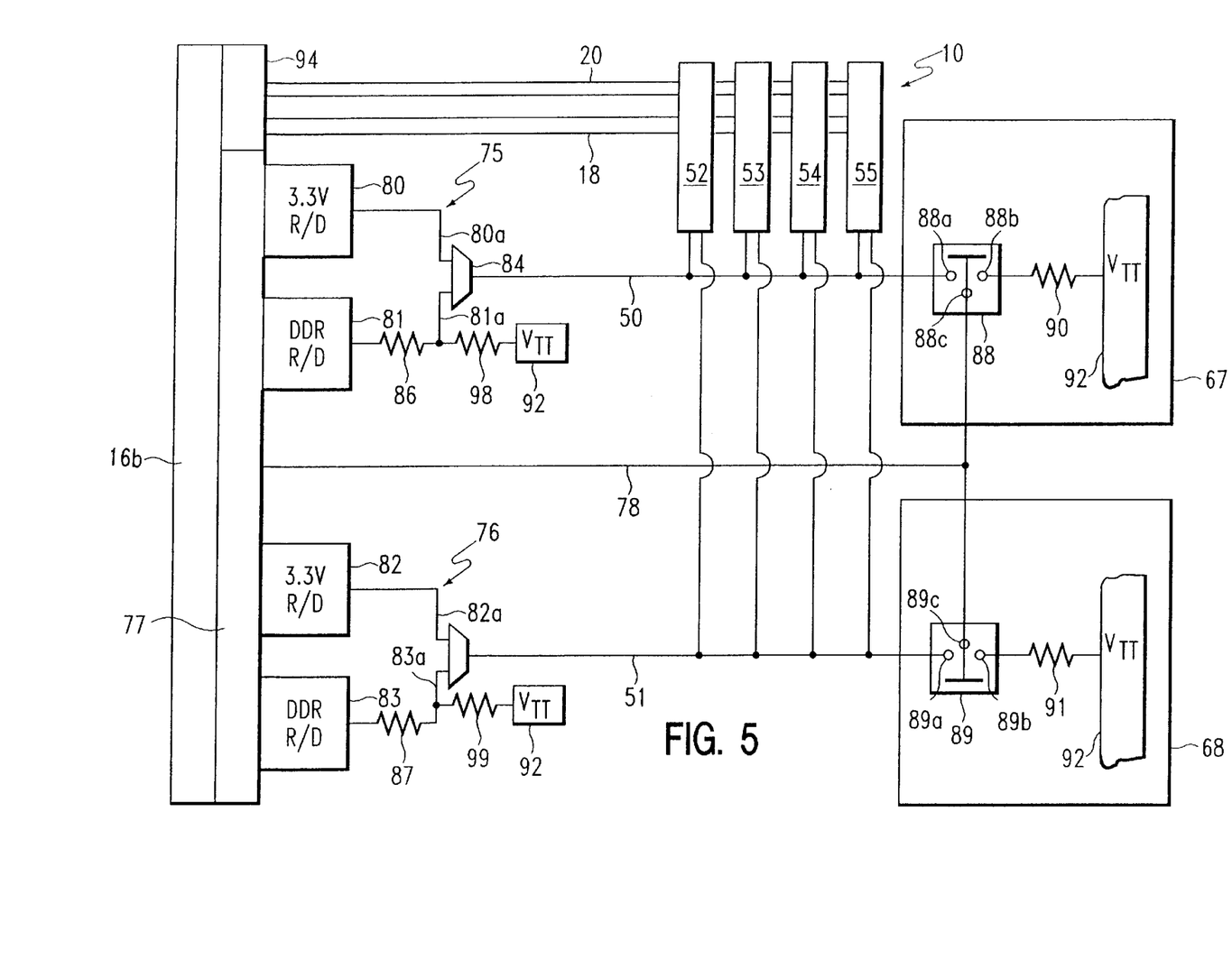
FIG. 5 is a block diagram of the invention and shows the improved memory controller of FIG. 4 with the DDR receiver/driver circuits provided with a source end parallel termination and associated data query lines that can be coupled or uncoupled from a distal end parallel termination such that the controller may be used with a memory populated with either DDR DIMMs or 3.3V DIMMs.

FIG. 5 is a block diagram of the invention substantially identical to that shown in FIG. 4 but is further provided with source end parallel terminations. The operation of this FIG. 5 is identical to that of FIG. 4 discussed above and therefore the details of its operation need not be repeated here. FIG. 5 particularly shows the DDR receiver/driver circuits 81 and 83 provided with both source end series terminations 86, 87 and source end parallel terminations 98 and 99. This circuit shown in FIG. 5 can thus be used when the DDR DIMMs populating the memory 10 requires that both ends of the associated data query lines 50, 51 be coupled to parallel terminations.

Thus there has been described an electronic data storage system provided different receiver/driver circuits coupled to the data storage in the system via a data bus that can be selectively provided with terminations thereby permitting the data storage to be populated either with modules that require that the data query lines be open-ended, i.e., without terminations, or with modules that require that the data bus be terminated.

This completes the description of the preferred embodiment of the invention.

Since changes may be made in the above construction and method without departing from the scope of the invention described herein, it is intended that all the matter contained in the above description or shown in the accompanying drawings will be interpreted in an illustrative sense and not in a limiting sense. Thus other alternatives and modifications will now become apparent to those skilled in the art without departing from the spirit and scope of the invention as set forth in the following claims.

What is claimed is:

1. An electronic data storage system for accessing data storage memory devices via a data bus comprising:
    a memory storage;
    a plurality of data storage devices populating said memory storage;
    a memory controller;
    a data bus comprising a plurality of data query lines having a proximal end and a distal end coupling said memory controller to said data storage devices;
    a plurality of parallel data line terminations;
    each respective one of said parallel data line terminations being coupled to the distal end of a respective one of said data query lines through a respective switch; and
    circuit means coupled between said memory controller and said data query lines for identifying the type of storage devices populating said memory storage and connecting a respective one of said parallel data line terminations to a respective distal end of one of said data query lines when required by the memory storage devices identified as populating said memory storage.

2. The electronic data storage system of claim 1 wherein there is further provided:
    a plurality of sets of first and second receiver/driver circuits;
    each of set of said first and second receiver/drivers circuits being coupled to a respective data query line through a selection circuit; and
    each respective one of said parallel data line terminations coupled to the distal end of a respective one of said data query lines further having voltage means coupled thereto.

3. The electronic data storage system of claim 2 wherein there is further provided:
    address and command buses coupling said memory controller to said storage devices; and
    said circuit means coupled between said memory controller and said data query lines includes a strobe line.

4. The electronic data storage system of claim 1 wherein:
    said circuit means coupled between said memory controller and said data query lines includes a storage device identification circuit for determining the type of memory storage devices in said memory storage system.

5. The electronic data storage system of claim 4 wherein:
    each set of said receiver/driver circuits comprises a first receiver/driver circuit designed for operation with a 3.3V DIMM and a second receiver/driver circuit being designed for operation with a DDR DIMM.

6. The electronic data storage system of claim 4 wherein:
    each data query line is coupled to respective data storage devices in said memory storage, to a respective set of receiver/driver circuits through a selection circuit, and to a respective one of said parallel line terminations through a switch.

7. The electronic data storage system of claim 4 wherein each set of said receiver/driver circuits is coupled to a respective data query line through a selection circuit.

8. The electronic data storage system of claim 7 wherein:
    each selection circuit is a multiplexor.

9. The electronic data storage system of claim 7 wherein:
    each selection circuit is a comparator.

10. An electronic data storage system for accessing data storage memory devices via a data bus comprising:
    a memory storage;
    a plurality of data storage devices populating said memory storage;
    a memory controller;
    a data bus comprising a plurality of data query lines coupling said memory controller to said data storage devices;
    address and command buses coupling said memory controller to said storage devices; and
    a plurality of parallel data line terminations;
    each respective parallel data line termination being coupled to a respective data query line through a respective bit switch;
    a voltage source having a known voltage coupled to said terminations;
    a selection circuit coupled between said memory controller and said parallel data line terminations for selectively coupling and decoupling respective ones of said parallel terminations to respective ones of said data query lines when said parallel terminations are required by the memory storage devices populating said memory storage;

said memory controller having a plurality of sets of receiver/driver circuits, each set of receiver driver circuits comprising a low voltage driver receiver circuit and a double rate receiver/driver circuit coupled to said memory, each of said sets being further coupled to a respective data query line; and there is further provided:
an identification circuit means for identifying the type of data storage in said memory;
a selection circuit means for selecting either the low voltage receiver/driver circuits or the double rate receiver/driver circuits to access the identified data storage devices; and
bit switch activation means for adding or removing a respective parallel.

11. An electronic data storage system for accessing data storage memory devices via a data bus comprising:

a memory storage;
a plurality of data storage devices having selected data interface voltage levels populating said memory storage;
a memory controller;
a plurality of parallel terminations;
a plurality of sets of receiver/driver circuits coupled to said memory controller;
each of set of receiver/driver circuits comprises a first and second receiver/drivers circuits being coupled to a respective data query line through a selection circuit; and
a data bus comprising a plurality of data query lines coupled between said receiver/driver circuits and said data storage devices;
each data query line, of said plurality of data query lines, having a proximal end coupled to a respective receiver/driver set and a distal end coupled to a respective one of said data storage devices and through a switch to a respective one of said parallel terminations; and
means coupled to said memory controller for selectively connecting a respective parallel termination to a respective distal end of a respective data query line when such terminations are required by the data storage devices populating said memory storage.

12. An electronic data storage system comprising:
a memory comprised of a plurality of data storage memory modules;
a memory controller; and
a data bus comprised of multiple data query lines coupled between said modules and said controller;
circuit means coupled between said memory controller and each respective one of said data query lines for identifying the type of data storage memory modules populating said memory; and
switching means coupled between said terminations and for connecting a respective one of said parallel data line terminations to a respective distal end of one of said data query lines when required by the memory storage devices identified as populating said memory storage for selectively providing each respective one of said data query lines with terminations thereby permitting the data storage memory to use either modules that require that the data query lines be open-ended or modules that require that the data bus be terminated.

13. An electronic data storage system for accessing data storage memory devices via a data bus comprising:
a memory storage;
a plurality of data storage devices having selected data interface voltage levels populating said memory storage;
a memory controller;
a plurality of parallel terminations;
a plurality of receiver/driver circuits coupled to said memory controller;
a data bus comprising a plurality of data query lines coupled between said receiver/driver circuits and said data storage devices;
each data query line, of said plurality of data query lines having a proximal end coupled to a respective receiver driver and a distal end coupled to a respective one of said data storage devices; and
means coupled to said memory controller for selectively applying a respective parallel termination to the respective distal ends of said data query lines when such terminations are required by the memory storage devices populating said memory storage;
a plurality of sets of receiver/driver circuits;
each set of receiver/driver circuits comprises a first receiver/driver circuit and a second receiver/driver circuit;
means for identifying the type of data storage memory modules in the memory system coupled thereto;
means coupled to each set of receiver/driver circuits for selecting either the first receiver/driver circuit in each set of receiver/driver circuits or the second receiver/driver circuit in each set of receiver/driver circuits as required to access the identified data storage memory modules, and
means for adding parallel terminations to the data query lines to permit the memory system to access data storage memory modules requiring parallel terminations on the data query lines.

14. The system of claim 13 wherein data storage memory modules are DIMMs.

15. The system of claim 13 wherein the data storage memory modules are DDR DIMMs.

16. The system of claim 13 wherein the data storage memory modules are 3.3V DIMMs.

17. An electronic data storage system for accessing data storage memory devices via a data bus comprising:
a memory storage;
a plurality of data storage devices having selected data interface voltage levels populating said memory storage;
a memory controller;
a plurality of parallel terminations;
a plurality of receiver/driver circuits coupled to said memory controller;
a data bus comprising a plurality of data query lines coupled between said receiver/driver circuits and said data storage devices;
each data query line, of said plurality of data query lines, having a proximal end coupled to a respective receiver driver and a distal end coupled to a respective one of said data storage devices; and means coupled to said memory controller for selectively applying a respective parallel termination to the respective distal ends of said data query lines when such terminations are required by the memory storage devices populating said memory storage;

an address bus and a control bus coupled to said memory;

an address bus and a control bus driver that can be set to different voltage levels;

a plurality of sets of receiver/driver circuits, each of said sets containing a 3.3V DIMM receiver/driver and a DDR DIMM receiver/driver;

an identification circuit means for identifying the type of data storage memory modules populating the memory; and means for activating a bit switch to couple a respective parallel termination to an end of each data query line.

18. The system of claim 17 wherein said identification circuit means is a comparator circuit.

19. The system of claim 17 wherein the identification circuit means transmits a switch activation pulse to the respective parallel termination at the end of each data query line when DDR DIMMs are found to be populating the memory.

20. The system of claim 17 wherein said storage devices populating the memory are provided with Serial Presence detects (SPD's) identification means.

21. An electronic data storage system for accessing data storage memory devices via a data bus comprising:

a memory storage;

a plurality of data storage devices populating said memory storage;

a memory controller;

a data bus comprising a plurality of data query lines coupling said memory controller to said data storage devices;

each data query line having a source end and a distal end;

a parallel and a series data line termination coupled to the source end of each data query line in said plurality of data query lines;

a parallel data line termination coupled to the distal end of each of data query line in said plurality of data query lines;

an identification circuit, for identifying the type of storage devices populating said memory storage, coupled to said memory controller; and a selection circuit and a set of receiver/driver circuits coupled between said identification circuit and each respective data query line in said plurality of data query lines;

each set of said receiver/driver circuits comprising a first receiver/driver circuit designed for operation with a parallel data line termination coupled to the distal end of a data query line and a second receiver/driver circuit designed for operation with a parallel and a serial data line termination coupled to the source end of a data query line;

each said selection circuit selectively connecting a respective receiver driver circuit in each set to respective ones of said data query lines when specific memory storage devices are identified as populating said memory storage.

22. The electronic data storage system of claim 21 wherein there is further provided:

voltage means coupled to said plurality of said first data lines terminations for changing the voltage levels on said data query lines when said terminations are coupled to said data query lines;

a strobe line for selectively connecting respective ones of said first set of data line terminations to respective ones of said data query lines when said terminations are required by the memory storage devices populating said memory storage; and each set of said receiver/driver circuits comprises a first receiver/driver circuit designed for operation with a 3.3V DIMM and a second receiver/driver circuit being designed for operation with a DDR DIMM.

* * * * *